United States Patent
Karpoormath et al.

(10) Patent No.: US 12,441,721 B2
(45) Date of Patent: Oct. 14, 2025

(54) SYNTHESIS OF HETEROCYCLIC COMPOUNDS FROM CARBOXAMIDE AND CARBOXAMIDE DERIVATIVES WITH HALOALKANOLS

(71) Applicant: University of KwaZulu-Natal, KwaZulu-Natal (ZA)

(72) Inventors: Rajshekhar Karpoormath, KwaZulu-Natal (ZA); Nisar Sayyad, KwaZulu-Natal (ZA)

(73) Assignee: University of KwaZulu-Natal, KwaZulu-Natal (ZA)

( * ) Notice: Subject to any disclaimer, the term of this patent is extended or adjusted under 35 U.S.C. 154(b) by 348 days.

(21) Appl. No.: 18/017,201

(22) PCT Filed: Jul. 21, 2021

(86) PCT No.: PCT/IB2021/056583
§ 371 (c)(1),
(2) Date: Jan. 20, 2023

(87) PCT Pub. No.: WO2022/018651
PCT Pub. Date: Jan. 27, 2022

(65) Prior Publication Data
US 2023/0295139 A1    Sep. 21, 2023

(30) Foreign Application Priority Data
Jul. 21, 2020 (IN) .............. 202021031239

(51) Int. Cl.
| | |
|---|---|
| *C07D 413/04* | (2006.01) |
| *C07D 263/10* | (2006.01) |
| *C07D 263/12* | (2006.01) |
| *C07D 263/14* | (2006.01) |
| *C07D 265/08* | (2006.01) |
| *C07D 273/01* | (2006.01) |
| *C07D 273/04* | (2006.01) |

(52) U.S. Cl.
CPC ......... *C07D 413/04* (2013.01); *C07D 263/10* (2013.01); *C07D 263/12* (2013.01); *C07D 263/14* (2013.01); *C07D 265/08* (2013.01); *C07D 273/01* (2013.01); *C07D 273/04* (2013.01)

(58) Field of Classification Search
CPC .................................................... C07D 413/04
See application file for complete search history.

(56) References Cited

U.S. PATENT DOCUMENTS

| | | |
|---|---|---|
| 3,420,825 A | 1/1969 | Trepanier |
| 4,970,210 A | 11/1990 | Brooks et al. |

FOREIGN PATENT DOCUMENTS

| | | |
|---|---|---|
| CN | 105001175 | 10/2015 |
| JP | H01221371 | 9/1989 |

OTHER PUBLICATIONS

Mitchell, Michael A., et al., "Synthesis of delta2-1, 3-oxazines using potassium fluoride on alumina", Synthesis, Jan. 1, 1994, pp. 675-677.

Written Opinion based on co-pending International Application No. PCT/IB2021/056583, dated Jan. 4, 2022—pp. 1-6.

International Search Report based on co-pending International Application No. PCT/IB2021/056583, dated Jan. 4, 2022—pp. 1-6.

*Primary Examiner* — Paul V Ward
(74) *Attorney, Agent, or Firm* — McCarer & English, LLC

(57) ABSTRACT

The invention provides for methods for the synthesis of various compounds through reaction of carboxamide, or carboxamide derivatives, with various substituted or unsubstituted haloalkanols in a one-step, single vessel, reaction mechanism. Preferably, but not exclusively, the reaction proceeds in the absence of any solvents, catalyst, base, or any further reagents.

12 Claims, 1 Drawing Sheet

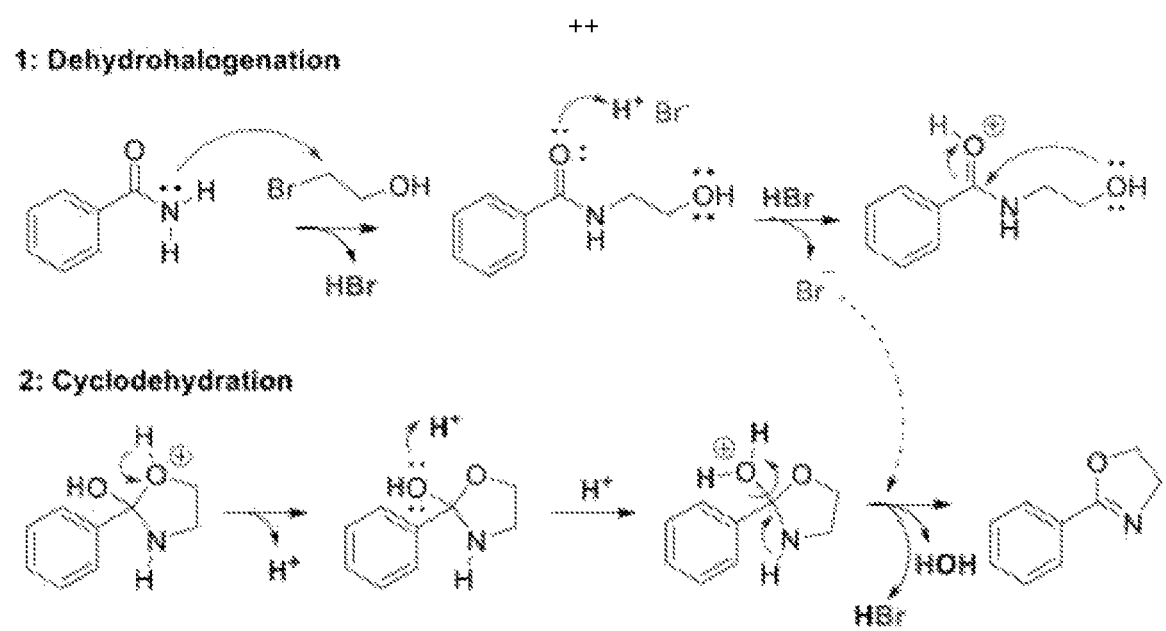

SYNTHESIS OF HETEROCYCLIC COMPOUNDS FROM CARBOXAMIDE AND CARBOXAMIDE DERIVATIVES WITH HALOALKANOLS

CROSS-REFERENCE TO RELATED APPLICATIONS

This application is a national stage application filed under 35 U.S.C. § 371 of PCT/IB2021/056583, filed Jul. 21, 2021, which claims the benefit of India patent application No. 202021031239, filed Jul. 21, 2020, all of which is incorporated herein, in their entireties, by reference.

INTRODUCTION

This invention relates to a method for the synthesis of heterocyclic compounds through the reaction of carboxamide, or carboxamide derivatives, with various haloalkanols. In particular, but not exclusively, the invention relates to the synthesis of compounds of the Formula (I), (II), (III), (IV), (V), and (VI) through the reaction of carboxamide, or carboxamide derivatives, with various substituted or unsubstituted haloalkanols in a one-step, single vessel, reaction mechanism.

BACKGROUND

Heterocyclic compounds, for example, oxazoline; oxazine; oxadiazine; and dioxazine, play an important role in several applications in the fields of biomedical chemistry and biomaterials, pharmaceutical product development, polymer chemistry, and agricultural chemistry, to name a few.

Current methods to synthesise these heterocyclic compounds each suffer from one or more of the following disadvantages: the use of undesirable organic solvents, the use of catalysts, high temperatures, high pressures, low yield and/or selectivity, multi-step reaction mechanisms, and other generally undesirable reaction conditions.

Oxazoline, for example, is a five-membered heterocyclic compound, known since the 19$^{th}$ century. It is also well known that 2-oxazoline has great importance in organic synthesis as a functional group, as well as a protecting group in hydroxyl, amine and carboxylic acid chemistry, and as a ligand in asymmetric catalysis. Furthermore, 2-oxazolines have a wide scope and application in pharmaceutical and polymer chemistry. Recently, 2-oxazoline polymers have emerged as an efficient macromolecule in the field of targeted drug delivery, and drug development, in various therapeutic areas. However, despite the clear importance of this heterocyclic compound, known synthetic approaches are not entirely desirably.

In one known method, for example, synthesis proceeds via a reaction of carboxylic acid with 1,2-alkanolamine to give an intermediate N-(β-hydroxyethyl)-carboxamide followed by cyclodehydration. Another known method proceeds via the preparation of N-(β-haloethyl)-carboxamide followed by dehydrohalogenation. These processes pass through two steps, i.e. the formation of carboxamide followed by cyclisation. In these methods, the intermediate carboxamide is synthesised from the reaction of either nitriles, carboxylic acid, lower alkyl ester of carboxylic acid or its acid chloride derivatives with 1,2-alkanolamine, or 2-haloethanol. Cyclisation, on the other hand, occurs by cyclodehydration or cyclodehydrohalogenation utilising dehydrating agents, (including sulfuric acid, aluminum oxide, iron oxide, $SOCl_2$, $PPh_3/CCl_4$, $TsCl/Et_3N$, carbodiimide, $PPh_3$-DEAD, or $PPh_3$-DDQ), or metal catalysts (including cadmium, organic/inorganic zinc salt, or iron compounds). Further, cyclodehydrohalogenation utilises inorganic bases, such as $NaCO_3$, NaOH, and/or KOH, in the presence of solvents.

It is, therefore, an object of the present invention to address at least some of the shortcomings of methods, known to those skilled in the art, for the synthesis of various heterocyclic compounds from the reaction of carboxamide, or derivates thereof, with various haloakanols.

SUMMARY OF THE INVENTION

According to a first aspect to the present invention, there is provided a method for the synthesis of a compound of the Formula (I)

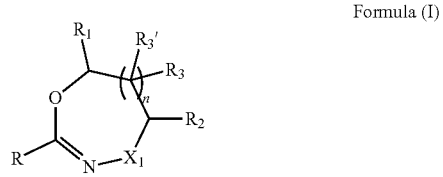

Formula (I)

the method comprising reacting a carboxamide or carboxamide derivative of the Formula (Ia)

Formula (Ia)

with a substituted alkanol of the Formula (Ib)

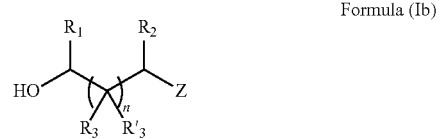

Formula (Ib)

wherein, n is 0, 1 or 2;

R is selected from the group consisting of hydrogen, optionally substituted alkyl, optionally substituted alkenyl, optionally substituted alkoxy, optionally substituted cycloalkyl optionally substituted heterocycloalkyl, optionally substituted aryl, and optionally substituted heteroaryl;

$R^1$ is selected from the group consisting of hydrogen, halogen, nitrile and optionally substituted alkyl, optionally substituted cycloalkyl optionally substituted heterocycloalkyl, and optionally substituted aryl;

$R^2$ is selected from the group consisting of hydrogen, optionally substituted hydroxyl, optionally substituted amine, halogen, nitrile, optionally substituted alkyl, optionally substituted cycloalkyl, optionally substituted heterocycloalkyl, and optionally substituted aryl;

$R^3$ and $R^{3'}$ are independently selected from the group consisting of hydrogen, optionally substituted hydroxyl, optionally substituted amine, halogen, nitrile, optionally substituted alkyl, optionally substituted alkenyl, optionally substituted alkoxy, optionally substituted cycloalkyl, optionally substituted heterocycloalkyl, optionally substituted aryl and optionally substituted heteroaryl;

X is selected from the group consisting of hydrogen, $NH_2$ OH, SH, $NHR^4$, $X^1$ is selected from the group consisting of NH, O, S, $NR^4$ and a direct bond;

$R^4$ is independently selected from the group consisting of hydrogen, optionally substituted, alkyl, optionally substituted cycloalkyl, optionally substituted heterocycloalkyl, optionally substituted aryl, and optionally substituted heteroaryl; and Z is siloxy, methanesulphonate, para-toluenesulfonate, or halogen, wherein the method comprises providing the carboxamide or carboxamide derivative and the substituted alkanol in a single reaction vessel to form a reaction mixture, and heating the reaction mixture at a temperature of about 100° C. to about 160° C. to yield the compound of the Formula (I).

According to a second aspect to the present invention there is provided a method for the synthesis of a compound of the Formula (II)

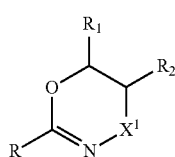

Formula (II)

the method comprising reacting a carboxamide or carboxamide derivative of the Formula (IIa)

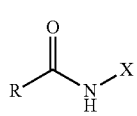

Formula (IIa)

with a substituted alkanol of the Formula (IIb)

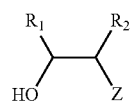

Formula (IIb)

wherein,

X is selected from the group consisting of hydrogen, $NH_2$, $NHR^4$ OH and SH;

$X^1$ is selected from the group consisting of NH, O, $NR^4$ and S;

$R^1$ is selected from the group consisting of hydrogen, halogen, nitrile and optionally substituted alkyl, optionally substituted cycloalkyl optionally substituted heterocycloalkyl, and optionally substituted aryl;

$R^2$ is selected from the group consisting of hydrogen, optionally substituted hydroxyl, optionally substituted amine, halogen, nitrile, optionally substituted alkyl, optionally substituted cycloalkyl, optionally substituted heterocycloalkyl, and optionally substituted aryl;

R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocloalkyl, optionally substituted aryl, and optionally substituted heteroaryl, Z is siloxyl, methanesulphonate, para-toluenesulfonate, or a halogen atom selected from the group consisting of Br, Cl, I and F, and $R^4$ is independently selected from the group consisting of hydrogen, optionally substituted, alkyl, optionally substituted cycloalkyl, optionally substituted heterocloalkyl, optionally substituted aryl, and optionally substituted heteroaryl;

wherein the method comprises providing the carboxamide or carboxamide derivative and the substituted alkanol in a single reaction vessel to form a reaction mixture, and heating the reaction mixture at a temperature of about 100° C. to about 160° C. to yield the compound of the Formula (II).

According to a third aspect to the present invention, there is provided a method for the synthesis of a compound of the Formula (III)

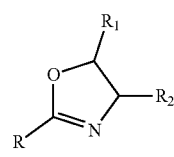

Formula (III)

the method comprising reacting a carboxamide or carboxamide derivative of the Formula (IIIa)

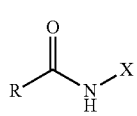

Formula (IIIa)

with a substituted alkanol of the Formula (IIIb)

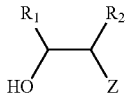

Formula (IIIb)

wherein, $R^1$ is selected from the group consisting of hydrogen, halogen, nitrile and optionally substituted alkyl, optionally substituted cycloalkyl optionally substituted heterocycloalkyl, and optionally substituted aryl;

$R^2$ is selected from the group consisting of hydrogen, optionally substituted hydroxyl, optionally substituted amine halogen, nitrile, optionally substituted alkyl, optionally substituted cycloalkyl, optionally substituted heterocycloalkyl, and optionally substituted aryl;

R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocycloalkyl, optionally substituted aryl, and optionally substituted heteroaryl, Z is siloxyl, methanesulphonate, para-toluenesulfonate, or a halogen atom selected from the group consisting of Br, Cl, I and F, and wherein the method comprises providing the carboxamide and the substituted alkanol in a single reaction vessel to form a reaction mixture, and heating the reaction mixture at a temperature of about 100° C. to about 160° C. to yield the compound of the Formula (III).

According to a further aspect to the present invention, there is provided a method for the synthesis of a compound of the Formula (IV)

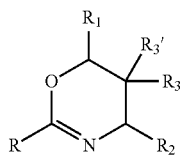

Formula (IV)

the method comprising reacting a carboxamide or carboxamide derivative of the Formula (IVa)

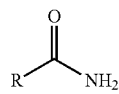

Formula (IVa)

with a substituted alkanol of the Formula (IVb)

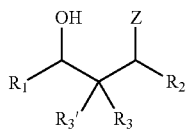

Formula (IVb)

wherein, $R^1$ is selected from the group consisting of hydrogen, halogen, nitrile and optionally substituted alkyl, optionally substituted cycloalkyl optionally substituted heterocycloalkyl, and optionally substituted aryl;

$R^2$ is selected from the group consisting of hydrogen, optionally substituted hydroxyl, optionally substituted amine halogen, nitrile, optionally substituted alkyl, optionally substituted cycloalkyl, optionally substituted heterocycloalkyl, and optionally substituted aryl;

$R^3$ and $R^{3'}$ is independently selected from the group consisting of hydrogen, optionally substituted hydroxyl, optionally substituted amine, halogen, nitrile, optionally substituted alkyl, optionally substituted alkenyl, optionally substituted alkoxy, optionally substituted cycloalkyl, optionally substituted heterocycloalkyl, optionally substituted aryl, and optionally substituted heteroaryl;

R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocycloalkyl, optionally substituted aryl, and optionally substituted heteroaryl, Z is siloxyl, methanesulphonate, para-toluenesulfonate, or a halogen atom selected from the group consisting of Br, Cl, I and F, and wherein the method comprises providing the carboxamide and the substituted alkanol in a single reaction vessel to form a reaction mixture, and heating the reaction mixture at a temperature of about 100° C. to about 160° C. to yield the compound of the Formula (IV).

According to a further aspect to the present invention, there is provided a method for the synthesis of a compound of the Formula (V)

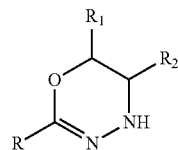

Formula (V)

the method comprising reacting a hydrazide or hydrazide derivative of the Formula (Va)

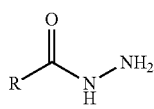

Formula (Va)

with a substituted alkanol of the Formula (Vb)

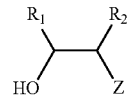

Formula (Vb)

wherein, $R^1$ is selected from the group consisting of hydrogen, halogen, nitrile and optionally substituted alkyl, optionally substituted cycloalkyl optionally substituted heterocycloalkyl, and optionally substituted aryl;

$R^2$ is selected from the group consisting of hydrogen, optionally substituted hydroxyl, optionally substituted amine halogen, nitrile, optionally substituted alkyl, optionally substituted cycloalkyl, optionally substituted heterocycloalkyl, and optionally substituted aryl;

R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocycloalkyl, optionally substituted aryl, and optionally substituted heteroaryl, Z is siloxyl, methanesulphonate, para-toluenesulfonate, or a halogen atom selected from the group consisting of Br, Cl, I and F, and wherein the method comprises providing the carboxamide and the substituted alkanol in a single reaction vessel to form a reaction mixture, and heating the reaction mixture at a temperature of about 100° C. to about 160° C. to yield the compound of the Formula (V).

According to a further aspect to the present invention, there is provided a method for the synthesis of a compound of the Formula (VI)

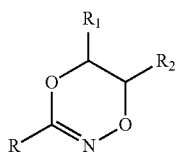

Formula (VI)

the method comprising reacting a N-hydroxycarboxamide or hydroxycarboxamide derivative of the Formula (VIa)

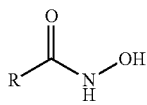

Formula (VIa)

with a substituted alkanol of the Formula (VIb)

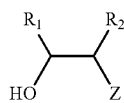

Formula (VIb)

wherein,
$R^1$ is selected from the group consisting of hydrogen, halogen, nitrile and optionally substituted alkyl, optionally substituted cycloalkyl optionally substituted heterocycloalkyl, and optionally substituted aryl;
$R^2$ is selected from the group consisting of hydrogen, optionally substituted hydroxyl, optionally substituted amine, halogen, nitrile, optionally substituted alkyl, optionally substituted cycloalkyl, optionally substituted heterocycloalkyl, and optionally substituted aryl;
R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocycloalkyl, optionally substituted aryl, and optionally substituted heteroaryl,
Z is siloxyl, methanesulphonate, para-toluenesulfonate, or a halogen atom selected from the group consisting of Br, Cl, I and F, and
wherein the method comprises providing the carboxamide and the substituted alkanol in a single reaction vessel to form a reaction mixture, and heating the reaction mixture at a temperature of about 100° C. to about 160° C. to yield the compound of the Formula (VI).

In one embodiment, $R^1$, $R^2$, $R^3$ and $R^{3'}$ are independently selected from the group consisting of H, optionally substituted hydroxyl, optionally substituted amine halogen, nitrile, or an optionally substituted linear or branched alkyl.

In one embodiment, $R^1$, $R^2$, $R^3$ and $R^{3'}$ are independently selected from optionally substituted linear or branched $C_1$-$C_{10}$ alkyl.

In a preferred embodiment, R is selected from the group consisting of optionally substituted linear or branched $C_1$-$C_{10}$ alkyl, optionally substituted linear or branched $C_2$-$C_{10}$ alkenyl, optionally substituted linear or branched $C_1$-$C_{10}$ alkoxy, optionally substituted $C_3$-$C_6$ cycloalkyl, optionally substituted $C_3$-$C_6$ heterocycloalkyl, optionally substituted $C_3$-$C_6$ aryl, and optionally substituted $C_3$-$C_6$ heteroaryl.

In a preferred embodiment, the reaction proceeds in the absence of any solvent, catalyst, base, or other reagents.

In one embodiment, R is substituted linear or branched $C_1$-$C_{10}$ alkyl substituted with one or more groups selected from the group consisting of halogen, CN, or OH.

In another embodiment, R is substituted linear or branched $C_2$-$C_{10}$ alkenyl substituted with one or more groups selected from the group consisting of halogen, CN, or OH.

In another embodiment, R is substituted linear or branched $C_1$-$C_{10}$ alkoxy substituted with one or more groups selected from the group consisting of halogen, CN, or OH.

In yet another embodiment, R is substituted $C_3$-$C_6$ cycloalkyl, substituted $C_3$-$C_6$ heterocycloalkyl, substituted $C_3$-$C_6$ aryl, or substituted $C_3$-$C_6$ heteroaryl, independently substituted with one or more groups selected from the group consisting of linear or branched $C_1$-$C_{10}$ alkoxy, halogen, NO2, optionally substituted linear or branched $C_1$-$C_{10}$ alkyl.

In yet another embodiment, R is substituted $C_3$-$C_6$ aryl, substituted with one or more groups selected from the group consisting of halogen, NO2, linear or branched $C_1$-$C_{10}$ alkoxy, optionally substituted linear or branched $C_1$-$C_{10}$ alkyl.

In a particularly preferred embodiment, R is a group selected from the group consisting of:

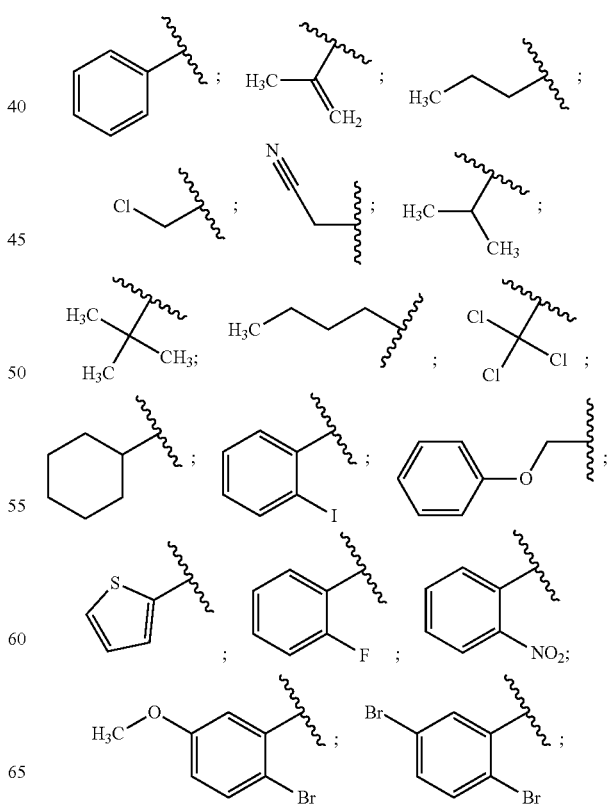

-continued

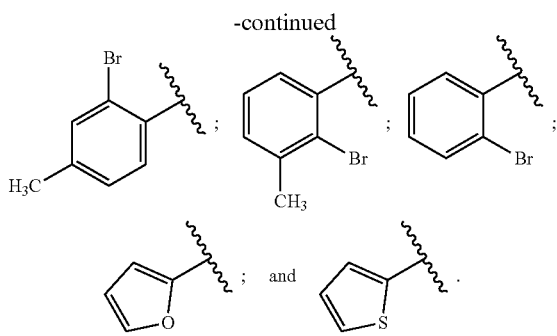

In a particularly preferred embodiment, the compound of the Formula (I) is a compound selected from the group consisting of:
2-phenyl-4,5-dihydrooxazole;
2-(prop-1-en-2-yl)-4,5-dihydrooxazole;
2-propyl-4,5-dihydrooxazole;
2-(chloromethyl)-4,5-dihydrooxazole;
2-(4,5-dihydrooxazol-2-yl)acetonitrile;
2-isopropyl-4,5-dihydrooxazole;
2-(tert-butyl)-4,5-dihydrooxazole;
2-butyl-4,5-dihydrooxazole;
2-(trichloromethyl)-4,5-dihydrooxazol;
2-cyclohexyl-2,5-dihydrooxazole;
2-(2-iodophenyl)-4,5-dihydrooxazole;
2-(phenoxymethyl)-4,5-dihydrooxazole;
2-(thiophen-2-yl)-4,5-dihydrooxazole;
2-(2-fluorophenyl)-4,5-dihydrooxazole;
2-(2-nitrophenyl)-4,5-dihydrooxazole;
2-(2,5-dibromophenyl)-4,5-dihydrooxazole;
2-(2-bromo-5-methoxyphenyl)-4,5-dihydrooxazole;
2-(2-bromo-4-methylphenyl)-4,5-dihydrooxazole;
2-(2-bromo-3-methylphenyl)-4,5-dihydrooxazole;
5-methyl-2-phenyl-4,5-dihydrooxazole;
2-phenyl-5,6-dihydro-4H-1,3-oxazine;
2-(prop-1-en-2-yl)-5,6-dihydro-4H-1,3-oxazine;
2-propyl-5,6-dihydro-4H-1,3-oxazine;
2-(chloromethyl)-5,6-dihydro-4H-1,3-oxazine;
2-isopropyl-5,6-dihydro-4H-1,3-oxazine;
2-isobutyl-5,6-dihydro-4H-1,3-oxazine;
2-butyl-5,6-dihydro-4H-1,3-oxazine;
2-cyclohexyl-5,6-dihydro-4H-1,3-oxazine;
2-(2-iodophenyl)-5,6-dihydro-4H-1,3-oxazine;
2-(2-bromophenyl)-5,6-dihydro-4H-1,3-oxazine;
2-(phenoxymethyl)-5,6-dihydro-4H-1,3-oxazine;
2-(furan-2-yl)-5,6-dihydro-4H-1,3-oxazine;
2-(thiophen-2-yl)-5,6-dihydro-4H-1,3-oxazine;
3-phenyl-5,6-dihydro-1,4,2-dioxazine; and
2-phenyl-5,6-dihydro-4H-1,3,4-oxadiazine.

BRIEF DESCRIPTION OF THE DRAWINGS

The invention will now be described in more detail with reference to the following non-limiting embodiments and figures in which:

FIG. 1 shows a proposed reaction mechanism, including simultaneous dehydrohalogenation and cyclodehydration, for a compound synthesised according to the present invention.

DETAILED DESCRIPTION OF A PREFERRED EMBODIMENT

The present invention will now be described more fully hereinafter with reference to the accompanying figures, in which some of the non-limiting embodiments of the invention are shown.

The invention as described hereinafter, should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, is meant to encompass the items listed thereafter, and equivalents thereof as well as additional items.

When describing the invention, the following terms, if present, have the following meanings, unless otherwise indicated. It should also be understood that when described herein any of the moieties defined forth below may be substituted with a variety of substituents, and that the respective definitions are intended to include such substituted moieties within their scope as set out below. In this regard, unless otherwise stated, the term "substituted" is to be defined as set out below. It should be further understood that the terms "groups" and "radicals" can be considered interchangeable when used herein.

"Alkyl" means straight or branched aliphatic hydrocarbon with the number of carbon atoms specified. Particular alkyl groups have 1 to 10 carbon atoms. More particular is lower alkyl, which has 1 to 8 carbon atoms. A further particular group has 1 to 6 carbon atoms. Exemplary straight-chain groups include methyl, ethyl n-propyl, and n-butyl. Branched means that one or more alkyl groups such as methyl, ethyl, propyl or butyl are attached to a linear alkyl chain. Exemplary branched chain groups include isopropyl and iso-butyl.

"Alkoxy" refers to the group —OR$^x$ where R$^x$ is alkyl with the number of carbon atoms specified. Particular alkoxy groups are methoxy, ethoxy, n-propoxy, isopropoxy, n-butoxy, tert-butoxy, sec-butoxy, n-pentoxy, n-hexoxy, and 1,2-dimethylbutoxy.

Particular alkoxy groups are lower alkoxy, i.e. with between 1 and 6 carbon atoms. Further particular alkoxy groups have between 1 and 4 carbon atoms.

"Alkylene" refers to divalent alkene radical groups having the number of carbon atoms specified, in particular having 1 to 10 carbon atoms and more particularly 1 to 8 carbon atoms which can be straight-chained or branched. This term is exemplified by groups such as methylene (—CH$_2$—), ethylene (—CH$_2$—CH$_2$—), or —CH(CH$_3$)— and the like.

"Alkenyl" refers to monovalent olefinically unsaturated hydrocarbon groups with the number of carbon atoms specified. Particular alkenyl has 2 to 10 carbon atoms, and more particularly, from 2 to 8 carbon atoms, which can be straight-chained or branched and having at least 1 and particularly from 1 to 2 sites of olefinic unsaturation. Particular alkenyl groups include ethenyl (—CH=CH$_2$), n-propenyl (—CH$_2$CH=CH$_2$), isopropenyl (—C(CH$_3$)=CH$_2$) and the like.

"Amino" refers to the radical —NH$_2$.

"Aryl" refers to a monovalent aromatic hydrocarbon group derived by the removal of one hydrogen atom from a single carbon atom of a parent aromatic ring system. In particular aryl refers to an aromatic ring structure, monocyclic or polycyclic, with the number of ring atoms specified. Specifically, the term includes groups that include from 5 to 10 ring members. Where the aryl group is a monocyclic ring system it preferentially contains 5 to 8 carbon atoms. Particularly aryl groups include phenyl, and naphthyl. The term "phenyl" and "Ph" is used interchangeably herein, unless indicated otherwise.

"Cycloalkyl" refers to a non-aromatic hydrocarbyl ring structure, monocyclic or polycyclic, with the number of ring atoms specified. A cycloalkyl may have from 3 to 10 carbon atoms, and in particular from 3 to 8 carbon atoms. Such cycloalkyl groups include, by way of example, single ring structures such as cyclopropyl, cyclobutyl, cyclopentyl, cyclohexyl, and cycloheptyl.

"Cyano" refers to the radical —CN.

"Halo" or "halogen" refers to fluoro (F), chloro (Cl), bromo (Br) and iodo (I).

"Hetero", when used to describe a compound or a group present on a compound, means that one or more carbon atoms in the compound or group have been replaced by a nitrogen, oxygen, or sulfur heteroatom. Hetero may be applied to any of the hydrocarbyl groups described above such as alkyl, e.g. heteroalkyl, cycloalkyl, e.g. heterocycloalkyl; aryl, e.g. heteroaryl, and the like having from 1 to 4, and particularly from 1, 2 or 3 heteroatoms, more typically 1 or 2 heteroatoms, for example, a single heteroatom.

"Heteroaryl" means an aromatic ring structure, monocyclic or fused polycyclic, that includes one or more heteroatoms independently selected from O, N and S and the number of ring atoms specified. In particular, the aromatic ring structure may have from 5 to 10 ring members. The heteroaryl group can be, for example, a five-membered or six-membered monocyclic ring or a fused bicyclic structure formed from fused five and six-membered rings or two fused six-membered rings or, by way of a further example, two fused five-membered rings. Each ring may contain up to four heteroatoms typically selected from nitrogen, sulphur and oxygen. Typically, the heteroaryl ring will contain up to 4 heteroatoms, more typically up to 3 heteroatoms, more usually up to 2, for example, a single heteroatom. In one embodiment, the heteroaryl ring contains at least one ring nitrogen atom. The nitrogen atoms in the heteroaryl rings can be basic, as in the case of an imidazole or pyridine, or essentially non-basic as in the case of an indole or pyrrole nitrogen. In general, the number of basic nitrogen atoms present in the heteroaryl group, including any amino group substituents of the ring, will be less than five.

As used herein, the term "heterocycloalkyl" means a stable non-aromatic ring structure, monocyclic or polycyclic, that includes one or more heteroatoms independently selected from O, N and S. The non-aromatic ring structure may have from 3 to 10 ring members, and in particular from 3 to 8 ring members. A fused heterocyclic ring system may include carbocyclic rings and need only to include one heterocyclic ring. As used herein, the term "heterocycloalkenyl" means a "heterocycloalkyl", wherein one bond of the ring is reduced; thus, the ring comprises a double bond.

"Hydroxyl" refers to the radical —OH, while "Oxo" refers to the radical =O.

"Substituted" refers to a group in which one or more hydrogen atoms are each independently replaced with the same or different substituent(s).

"Sulfo" or "sulfonic acid" refers to a radical such as —SO$_3$H. "Thiol" refers to the group —SH.

As used herein, the term "substituted with one or more" refers to one to four substituents. In one embodiment it refers to one to three substituents. In further embodiments, it refers to one or two substituents. In a yet further embodiment, it refers to one substituent.

Where ranges are referred to in this specification, for example, C$_{1-10}$ alkyl, the citation of a range should be considered a representation of each member of the range.

This invention relates broadly to a method for the synthesis of heterocyclic compounds through the reaction of carboxamide, or carboxamide derivatives, with various substituted or unsubstituted haloalkanols.

More specifically, the invention relates to the synthesis of compounds of the Formula (I), (II), (III), (IV), (V) and (VI) as described herein, through the reaction of carboxamide, or carboxamide derivatives, with various substituted or unsubstituted haloalkanols in a one-step, single vessel, reaction mechanism. Preferably the reaction proceeds in the absence of any solvents, catalyst, base, or any further reagents.

The inventors of the present invention have developed a one-step, single vessel, reaction of carboxamide and carboxamide derivatives, with various substituted or unsubstituted haloalkanols, which surprisingly yields the desired heterocyclic reaction product in unexpected yield and purity. Without thereby wishing to be bound by any particular theory, the inventors posit that the reaction passes through a simultaneous process of dehydrohalogenation followed by cyclodehydration to yield the desired products. In addition to being a one-step, single vessel, reaction the method of the invention advantageously proceeds in the absence of any solvent, base, or catalyst. In addition, the reaction proceeds at a relatively moderate temperature and relatively low pressure.

In one embodiment, for example, the reaction of carboxamide, or the carboxamide derivative (e.g. hydrazide or N-hydroxycarboxamide), with haloalkanol (e.g. 2-bromoethanol, 2-chloroethanol, 2-iodoethanol, 3-bromopropanol, or 1-bromo-2-propanol) proceeds in a one-step single vessel reaction through microwave heating or thermal heating. Microwave heating can be applied at a temperature of between about 100° C. to about 160° C. for a period of about 10 minutes to about 60 minutes. Thermal heating can be applied at a temperature of between about 100° C. to about 160° C. for a period of about 8 hours to about 15 hours.

The temperature range for microwave heating and thermal heating can suitably be about 100° C. to about 160° C., preferably about 110° C. to about 150° C., more preferably about 120° C. to about 140° C., most preferably about 130° C.

Heating can be applied by microwave heating for about 10 minutes to about 60 minutes, preferably for about 20 minutes to about 50 minutes, more preferably for about 30 minutes to about 40 minutes, most preferably for about 40 minutes. Heating can be applied by thermal heating for about 8 hours to about 20 hours, preferably for about 9 hours to about 18 hours, more preferably for about 10 hours to about 16 hours, more preferably for about 10 to about 14 hours, most preferably for about 12 hours.

In one embodiment, the invention provides for a method for the synthesis of a compound of the Formula (I)

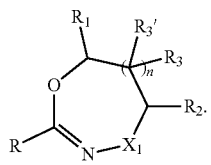

Formula (I)

The method comprises reacting a carboxamide, or carboxamide derivative, of the Formula (Ia)

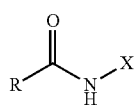

Formula (Ia)

with a substituted alkanol of the formula Formula (Ib)

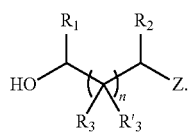

Formula (Ib)

In one embodiment, n in Formula (Ib) above is selected from 0, 1 or 2.

In another embodiment, the invention provides for a method for the synthesis of a compound of the Formula (II)

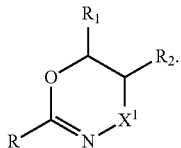

Formula (II)

The method comprises reacting a carboxamide or carboxamide derivative of the Formula (IIa)

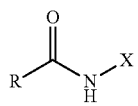

Formula (IIa)

with a substituted alkanol of the Formula (IIb)

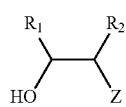

Formula (IIb)

In another embodiment, the invention provides for a method for the synthesis of a compound of the Formula (III)

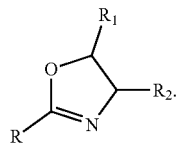

Formula (III)

The method comprises reacting a carboxamide or carboxamide derivative of the Formula (IIIa)

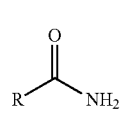

Formula (IIIa)

with a substituted alkanol of the Formula (IIIb)

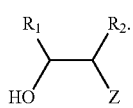

Formula (IIIb)

In another embodiment, the invention provides for a method for the synthesis of a compound of the Formula (IV)

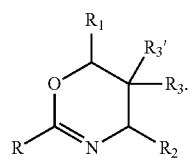

Formula (IV)

The method comprising reacting a carboxamide or carboxamide derivative of the Formula (IVa)

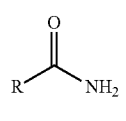

Formula (IVa)

with a substituted alkanol of the Formula (IV)

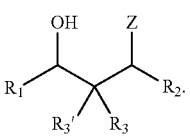

Formula (IVb)

In another embodiment, the invention provides for a method for the synthesis of a compound of the Formula (V)

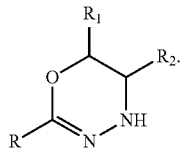

Formula (V)

The method comprising reacting a hydrazide or hydrazide derivative, of the Formula (Va)

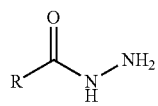

Formula (Va)

with a substituted alkanol of the Formula (Vb)

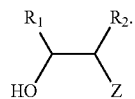

Formula (Vb)

In another embodiment, the invention provides for a method for the synthesis of a compound of the Formula (VI)

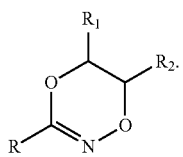

Formula (VI)

The method comprising reacting a N-hydroxycarboxamide or hydroxycarboxamide derivative, of the Formula (VIa)

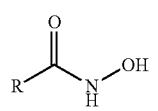

Formula (VIa)

with a substituted alkanol of the Formula (VIb)

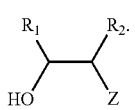

Formula (VIb)

Preferably, the method of the present invention comprises providing the carboxamide or carboxamide derivative and the substituted alkanol in a single reaction vessel to form a reaction mixture, and heating the reaction mixture at a temperature of about 110° C. to about 150° C. to yield the desired compound in a single step reaction.

In one embodiment, R is selected from the group consisting of hydrogen, optionally substituted alkyl, optionally substituted alkenyl, optionally substituted alkoxy, optionally substituted cycloalkyl optionally substituted heterocycloalkyl, optionally substituted aryl and optionally substituted heteroaryl.

The optionally substituted linear or branched alkyl may for be a $C_1$-$C_{10}$ alkyl, the optionally substituted linear or branched alkenyl may be a $C_2$-$C_{10}$ alkenyl, the optionally substituted linear or branched alkoxy may be a $C_1$-$C_{10}$ alkoxy, the optionally substituted cycloalkyl may be a $C_3$-$C_6$ cycloalkyl, the optionally substituted heterocycloalkyl may be a $C_3$-$C_6$ heterocycloalkyl, the optionally substituted aryl may be a $C_3$-$C_6$ aryl, and the optionally substituted heteroaryl may be a $C_3$-$C_6$ heteroaryl, Where substituted, the above mentioned groups may be substituted with one or more occurrences of halogen, CN, or OH. The aforementioned carbon number ranges, for example $C_1$-$C_{10}$ alkyl, should be understood to be a representation of each member of the range.

$R^1$ and $R^2$ may be independently selected from the group consisting of hydrogen, optionally substituted hydroxyl, optionally substituted amine, halogen, nitrile and optionally substituted alkyl, optionally substituted cycloalkyl optionally substituted heterocycloalkyl, optionally substituted aryl and optionally. In a particular embodiment, $R^1$ and $R^2$ may be independently selected from optionally substituted linear or branched $C_1$-$C_{10}$ alkyl.

$R^3$ may be independently selected from the group consisting of hydrogen, optionally substituted hydroxyl, optionally substituted amine, halogen, nitrile, optionally substituted alkyl, optionally substituted alkenyl, optionally substituted alkoxy, optionally substituted cycloalkyl, optionally substituted heterocycloalkyl, optionally substituted aryl and optionally substituted heteroaryl.

$R^{3'}$ may be independently selected from the group consisting of hydrogen, optionally substituted hydroxyl, optionally substituted amine, halogen, nitrile, optionally substituted alkyl, optionally substituted alkenyl, optionally substituted alkoxy, optionally substituted cycloalkyl, optionally substituted heterocycloalkyl, optionally substituted aryl and optionally substituted heteroaryl.

X may be selected from the group consisting of hydrogen, OH, SH, and $NHR^4$, while $X^1$ may accordingly be selected from the group consisting of O, S, $NR^4$ and a direct bond.

$R^4$ may be independently selected from the group consisting of hydrogen, optionally substituted, alkyl, optionally substituted cycloalkyl, optionally substituted heterocycloalkyl, optionally substituted aryl, and optionally substituted heteroaryl.

Z is siloxyl, methanesulphonate, para-toluenesulfonate, or halogen. The halogen atom may be bromine (Br), chlorine (Cl), iodine (I), or fluorine (F).

Exemplary compounds of the present invention may be represented by the chemical structures provided in Table 1 below.

TABLE 1

Chemical structures of the compounds of the invention.

| Number | Structure | Compound |
|---|---|---|
| 1 |  | 2-phenyl-4,5-dihydrooxazole |
| 2 |  | 2-(prop-1-en-2-yl)-4,5-dihydrooxazole |
| 3 |  | 2-propyl-4,5-dihydrooxazole |
| 4 |  | 2-(chloromethyl)-4,5-dihydrooxazole |
| 5 |  | 2-(4,5-dihydrooxazol-2-yl)acetonitrile |
| 6 |  | 2-isopropyl-4,5-dihydrooxazole |
| 7 |  | 2-(tert-butyl)-4,5-dihydrooxazole |
| 8 |  | 2-butyl-4,5-dihydrooxazole |
| 9 |  | 2-(trichloromethyl)-4,5-dihydrooxazole |
| 10 |  | 2-cyclohexyl-2,5-dihydrooxazole |

TABLE 1-continued

Chemical structures of the compounds of the invention.

| Number | Structure | Compound |
|---|---|---|
| 11 | 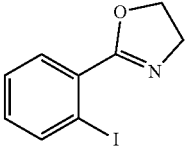 | 2-(2-iodophenyl)-4,5-dihydrooxazole |
| 12 | 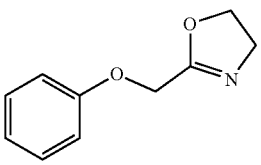 [SMILES: c1ccc(OCC2=NCCO2)cc1] | 2-(phenoxymethyl)-4,5-dihydrooxazole |
| 13 | 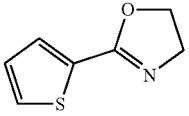 | 2-(thiophen-2-yl)-4,5-dihydrooxazole |
| 14 | 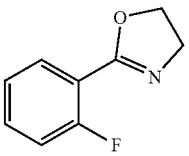 [SMILES: Fc1ccccc1C1=NCCO1] | 2-(2-fluorophenyl)-4,5-dihydrooxazole |
| 15 | 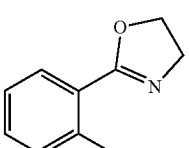 | 2-(2-nitrophenyl)-4,5-dihydrooxazole |
| 16 | 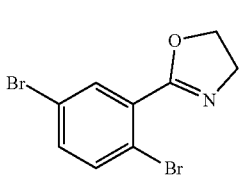 [SMILES: Brc1ccc(Br)c(C2=NCCO2)c1] | 2-(2,5-dibromophenyl)-4,5-dihydrooxazole |
| 17 | 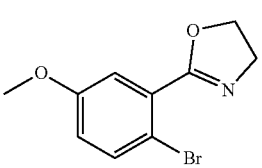 | 2-(2-bromo-5-methoxyphenyl)-4,5-dihydrooxazole |
| 18 | 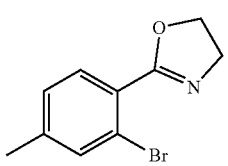 | 2-(2-bromo-4-methylphenyl)-4,5-dihydrooxazole |
| 19 | 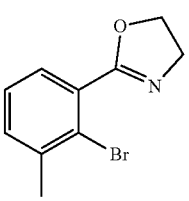 | 2-(2-bromo-3-methylphenyl)-4,5-dihydrooxazole |

TABLE 1-continued
Chemical structures of the compounds of the invention.
| Number | Structure | Compound |
|---|---|---|
| 20 | 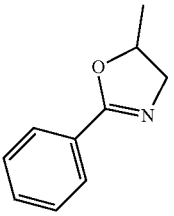 | 5-methyl-2-phenyl-4,5-dihydrooxazole |
| 21 | 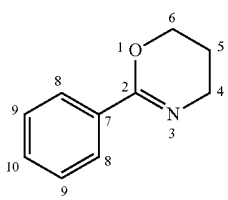 | 2-phenyl-5,6-dihydro-4H-1,3-oxazine |
| 22 | 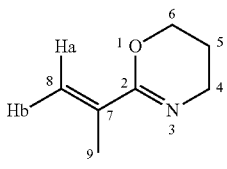 | 2-(prop-1-en-2-yl)-5,6-dihydro-4H-1,3-oxazine |
| 23 | 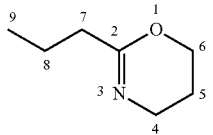 | 2-propyl-5,6-dihydro-4H-1,3-oxazine |
| 24 | 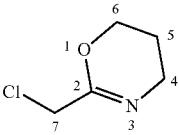 | 2-(chloromethyl)-5,6-dihydro-4H-1,3-oxazine |
| 25 | 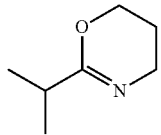 | 2-isopropyl-5,6-dihydro-4H-1,3-oxazine |
| 26 | 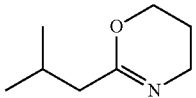 | 2-isobutyl-5,6-dihydro-4H-1,3-oxazine |
| 27 | 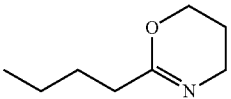 | 2-butyl-5,6-dihydro-4H-1,3-oxazine |
| 28 | 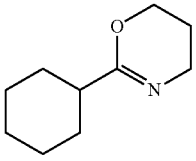 [SMILES: C1CCC(C2=NCCCO2)CC1] | 2-cyclohexyl-5,6-dihydro-4H-1,3-oxazine |

TABLE 1-continued

Chemical structures of the compounds of the invention.

| Number | Structure | Compound |
|---|---|---|
| 29 | | 2-(2-iodophenyl)-5,6-dihydro-4H-1,3-oxazine |
| 30 | | 2-(2-bromophenyl)-5,6-dihydro-4H-1,3-oxazine |
| 31 | | 2-(phenoxymethyl)-5,6-dihydro-4H-1,3-oxazine |
| 32 | | 2-(furan-2-yl)-5,6-dihydro-4H-1,3-oxazine |
| 33 | | 2-(thiophen-2-yl)-5,6-dihydro-4H-1,3-oxazine |
| 34 | | 3-phenyl-5,6-dihydro-1,4,2-dioxazine |
| 35 | | 2-phenyl-5,6-dihydro-4H-1,3,4-oxadiazine |

General Synthetic Approach

Carboxamide, hydrazide, or N-hydroxycarboxamide (1 eq) and haloalkanol (2 eq) were added to a single reaction vessel. The resultant mixture was heated to 130° C. for 40 minutes in the microwave at 100 W power. Alternatively, the resultant mixture was heated by thermal heating to 130° C. for 12 hours. Reaction progress was monitored with thin layer chromatography. The crude compounds were purified by silica gel column chromatography in hexane:ethyl acetate solvent mixtures. Pure compounds were obtained in moderate to excellent yields of about 40 to about 90%.

The compounds were characterised by FT-IR, NMR ($^1$H, and $^{13}$C) spectroscopy, and/or mass spectrometry.

EXPERIMENTAL DATA

2-phenyl-4,5-dihydrooxazole (1)

Yellow viscous liquid, Yield=90%. FTIR: (adsorbed on KBr, $v_{max}$, cm$^{-1}$): 3065.31 (C—H, Ar), 2960.16 (C—H, CH$_2$), 2929.34 (C—H, CH$_2$), 1719.19 (C=N), 1449.89 (C=O, Ar), 1271.43 (C—N), 1105.60 (C—O), 707.43 (C—H, Ar). NMR: $^1$H-NMR (400 MHz, CDCl$_3$, 25° C.): δ=8.07 (d, J=7.9 Hz, 2H, 7-H), 7.58 (t, J=7.5 Hz, 1H, 9-H), 7.46 (t, J=7.8 Hz, 2H, 8-H), 4.63 (t, J=6.2 Hz, 2H, 5-H), 3.65 (t, J=6.2 Hz, 2H, 4-H) ppm. $^{13}$C-NMR (100 MHz, CDCl$_3$, 25° C.): δ=167.10 (C2), 133.43 (C9), 129.91 (C7), 129.61 (C6), 128.60 (C8), 64.36 (C5), 28.90 (C4) ppm.

2-(prop-1-en-2-yl)-4,5-dihydrooxazole (2)

Colourless liquid, Yield 76.59%; NMR: $^1$H-NMR (400 MHz, CDCl$_3$, 25° C.): δ=6.10 (s, 1H, 7-Ha), 5.54 (p, J=1.56 Hz, 1H, 7-Hb), 4.38 (t, J=6.12 Hz, 2H, 5-H), 3.48 (t, J=6.12 Hz, 2H, 4-H), 1.89 (t, J=1.26 Hz, 3H, 8-H) ppm. $^{13}$C-NMR (100 MHz, CDCl$_3$, 25° C.): δ=167.26 (C2), 135.10 (C6), 126.40 (C7), 64.20 (C5), 28.90 (C4), 18.53 (C8) ppm.

2-propyl-4,5-dihydrooxazole (3)

Yellow liquid, Yield 39.66%; NMR: $^1$H-NMR (400 MHz, DMSO-d$_6$, 25° C.) δ 4.38 (t, J=6.1 Hz, 2H), 3.51 (t, J=6.1 Hz, 2H), 2.33 (t, J=7.4 Hz, 2H), 1.67 (m, 2H), 0.96 (t, J=7.4 Hz, 3H). $^{13}$C NMR (100 MHz, DMSO-d$_6$, 25° C.) δ=173.29 (C), 63.73 (CH$_2$), 36.14 (CH$_2$), 28.84 (CH$_2$), 18.53 (CH$_2$), 13.74 (CH$_3$) ppm.

2-(chloromethyl)-4,5-dihydrooxazole (4)

Pale yellow liquid, Yield 45.07%; FTIR: (adsorbed on KBr, $v_{max}$, cm$^{-1}$): 2958.56 (C—H, CH$_2$), 2922.89 (C—H, CH$_2$), 2853.57 (CH, CH$_2$), 1740.75 (C=N), 1265.00 (C—H), 1129.78 (C—O). NMR: $^1$H-NMR (400 MHz, CDCl$_3$, 25° C.): δ=4.48 (dt, J=6.4, 1.3 Hz, 2H, 5-H), 3.87 (s, 2H, 6-H), 3.53 (t, J=6.2 Hz, 2H, 4-H) ppm. $^{13}$C-NMR (100 MHz, CDCl$_3$, 25° C.): δ=166.83 (C2), 65.28 (C5), 41.07 (C6), 29.91 (C4) ppm.

2-(4,5-dihydrooxazol-2-yl)acetonitrile (5)

Colourless liquid, Yield 28.4%; FTIR: (adsorbed on KBr, $v_{max}$, cm$^{-1}$): 2967.76 (C—H, CH$_2$), 2929.11 (C—H, CH$_2$), 2264.39 (nitrile), 1745.61 (C=N), 1192.30 (C—O). NMR: $^1$H-NMR (400 MHz, CDCl$_3$, 25° C.): δ=4.47 (t, J=6.0 Hz, 2H, 5-H), 3.52 (s, 2H, 6-H), 3.51 (t, J=6.0 Hz, 2H, 4-H) ppm. $^{13}$C-NMR (100 MHz, CDCl$_3$, 25° C.): δ=162.80 (C2), 112.91 (C7), 65.72 (C5), 27.89 (C4), 24.63 (C6) ppm.

2-isopropyl-4,5-dihydrooxazole (6)

Yellow liquid (350 mg); NMR: $^1$H-NMR (400 MHz, DMSO-d$_6$, 25° C.) δ 4.35 (t, J=6.25 Hz, 2H), 3.49 (t, J=6.83 Hz, 2H), 2.60-2.53 (m, 1H), 1.17 (d, J=7.06 Hz, 6H). $^{13}$C-NMR (100 MHz, DMSO-d$_6$, 25° C.) δ=176.7, 63.6, 33.9, 28.9, 18.9 ppm.

2-(tert-butyl)-4,5-dihydrooxazole (7)

Pale yellow liquid, Yield 68.80%; NMR: $^1$H-NMR (400 MHz, CDCl$_3$, 25° C.): δ=4.35 (t, J=6.0 Hz, 2H), 3.49 (t, J=6.0 Hz, 2H), 1.20 (s, 9H) ppm. $^{13}$C-NMR (100 MHz, DMSO-d$_6$, 25° C.) δ=178.18 (C), 63.71 (CH$_2$), 38.94 (C), 29.04 (CH$_2$), 27.22 (CH$_3$)$_3$ ppm.

2-butyl-4,5-dihydrooxazole (8)

Yellow liquid, Yield 50.22%; NMR: $^1$H-NMR (400 MHz, DMSO-d$_6$, 25° C.) δ=4.36 (t, J=6.16 Hz, 2H), 3.49 (t, J=6.33 Hz, 2H), 2.33 (t, J=7.88 Hz, 2H), 1.65-1.57 (m, 2H), 1.39-1.30 (m, 2H), 0.90 (t, J=7.50 Hz, 3H). $^{13}$C-NMR (100 MHz, DMSO-d$_6$, 25° C.) δ=173.4, 63.6, 33.8, 28.8, 27.0, 22.2, 13.7.

2-(trichloromethyl)-4,5-dihydrooxazol (9)

Yellow liquid, Yield 37.30%; NMR: $^1$H-NMR (400 MHz, DMSO-d$_6$, 25° C.) δ=4.65 (t, J=5.68 Hz, 2H), 3.60 (t, J=5.52 Hz, 2H). $^{13}$C-NMR (100 MHz, DMSO ds, 25° C.) δ=161.7, 89.5, 67.9, 26.9 ppm.

2-cyclohexyl-2,5-dihydrooxazole (10)

Yellow liquid, Yield 66.73%; NMR: $^1$H-NMR (400 MHz, DMSO-d$_6$, 25° C.) δ=4.35 (t, J=6.1 Hz, 2H), 3.48 (t, J=6.1 Hz, 2H), 2.36-2.28 (tt, J=11.2, 3.6 Hz, 1H), 1.90 (m, 2H), 1.73 (m, 2H), 1.62 (m, 1H), 1.44 (q, J=12.0 Hz, 2H), 1.32-1.18 (m, 3H) ppm; $^{13}$C-NMR (100 MHz, DMSO-d$_6$, 25° C.) δ=175.63 (C), 63.51 (CH$_2$), 43.08 (CH$_2$), 29.06 (C), 29.03 (CH2)2, 25.78 (CH$_2$), 25.44 (CH$_2$)$_2$ ppm.

2-(2-iodophenyl)-4,5-dihydrooxazole (11)

Colourless liquid, Yield 58.80%; FTIR: (adsorbed on KBr, $v_{max}$, cm$^{-1}$): 2926.14 (C—H, CH$_2$), 2892.53 (C—H, CH$_2$), 1729.85 (C=N), 1289.37 (C—O), 1248.91 (C—O), 1089.39 (C—N), 1045.30 (C—N), 741.17 (C—H, Ar). NMR: $^1$H-NMR (400 MHz, DMSO-d$_6$, 25° C.) δ=8.00 (dd, J=8.10, 1.42 Hz, 1H), 7.87 (dd, J=7.99 Hz, 1.62 Hz, 1H), 7.44-7.40 (m, 1H), 7.19-7.15 (m, 1H), 4.64 (t, J=6.17 Hz, 2H), 3.65 (t, J=6.37 Hz, 2H) ppm. $^{13}$C-NMR (400 MHz, DMSO-d$_6$, 25° C.) δ=165.9, 141.5, 134.4, 133.1, 131.3, 129.8, 128.1, 64.9, 28.5 ppm.

2-(phenoxymethyl)-4,5-dihydrooxazole (12)

Colourless liquid, Yield 48%; NMR: $^1$H-NMR (400 MHz, DMSO-d$_6$, 25° C.) δ=7.31 (t, J=8.0 Hz, 2H), 7.01 (tt, J=7.4, 1.4 Hz, 1H), 6.93 (td, J=7.8, 1.4 Hz, 2H), 4.68 (s, 2H), 4.51 (t, J=6.1 Hz, 2H), 3.52 (t, J=6.1 Hz, 2H) ppm; $^{13}$C-NMR (100 MHz, DMSO-d$_6$, 25° C.) δ=168.60 (C), 157.71 (C), 129.65 (CH), 121.92 (CH), 114.71 (CH), 65.15 (CH$_2$), 64.37 (CH$_2$), 28.31 (CH$_2$) ppm.

2-(thiophen-2-yl)-4,5-dihydrooxazole (13)

Yellow liquid, Yield 80.24%; NMR: $^1$H-NMR (400 MHz, CDCl$_3$, 25° C.): δ=7.84 (dd, J=3.7 Hz, 1.2 Hz, 1H), 7.59 (dd, J=5.0 Hz, 1.2 Hz, 1H), 7.11 (dd, J=5.0 Hz, 5.0 Hz, 1H), 4.59 (t, J=6.2 Hz, 2H), 3.61 (t, J=6.2 Hz, 2H) ppm. $^{13}$C-NMR (100 MHz, CDCl$_3$, 25° C.): δ=161.7, 134.1, 133.0, 133.1, 127.9, 64.3, 28.6 ppm.

2-(2-fluorophenyl)-4,5-dihydrooxazole (14)

Colourless liquid, Yield 60.23%; NMR: $^1$H-NMR (400 MHz, CDCl$_3$, 25° C.): δ=7.95 (dt, J=7.6 Hz, 1.8 Hz, 1H), 7.52 (m, 1H), 7.20 (t, J=7.7 Hz, 1H), 7.13 (t, J=9.6 Hz, 1H), 4.63 (t, J=6.1 Hz, 2H), 3.63 (t, J=6.1 Hz, 2H) ppm. $^{13}$C-

NMR (100 MHz, CDCl$_3$, 25° C.): δ=163.8, 163.7, 160.8, 134.9, 134.8, 132.2, 124.1, 124.0, 118.2, 118.1, 117.2, 117.0, 64.5, 28.5 ppm.

2-(2-nitrophenyl)-4,5-dihydrooxazole (15)

Pale yellow liquid, Yield 59.16%; NMR: $^1$H-NMR (400 MHz, CDCl$_3$, 25° C.): δ=7.95 (dd, J=7.8 Hz, 1.3 Hz, 1H), 7.77 (dd, J=7.5 Hz, 1.7 Hz, 1H), 7.70 (dt, J=7.5 Hz, 1.4 Hz, 1H), 7.66 (dt, J=7.6 Hz, 1.7 Hz, 1H), 4.64 (t, J=6.2 Hz, 2H), 3.60 (t, J=6.2 Hz, 2H) ppm. $^{13}$C-NMR (100 MHz, CDCl$_3$, 25° C.): δ=165.1, 148.2, 133.2, 132.1, 130.0, 127.3, 124.1, 65.5, 27.8 ppm.

2-(2,5-dibromophenyl)-4,5-dihydrooxazole (16)

White solid, Yield 80.10%; NMR: $^1$H-NMR (400 MHz, CDCl$_3$, 25° C.): δ=7.96 (d, J=2.4 Hz, 1H), 7.53 (d, J=8.5 Hz, 1H), 7.46 (dd, J=8.5 Hz, 2.4 Hz, 1H), 4.64 (t, J=6.1 Hz, 2H), 3.64 (t, J=6.1 Hz, 2H) ppm. $^{13}$C-NMR (100 MHz, CDCl$_3$, 25° C.): δ=164.3, 135.9, 134.4 133.0, 121.2, 120.7, 65.1, 28.2 ppm.

2-(2-bromo-5-methoxyphenyl)-4,5-dihydrooxazole (17)

Pale yellow liquid, Yield 85.10%; NMR: $^1$H-NMR (400 MHz, CDCl$_3$, 25° C.): δ=7.52 (d, J=8.8 Hz, 1H), 7.36 (d, J=3.0 Hz, 1H), 6.89 (dd, J=9.0, 3.2 Hz, 1H), 4.62 (t, J=6.1 Hz, 2H), 3.80 (s, 3H), 3.63 (t, J=6.1 Hz, 2H)) ppm. $^{13}$C-NMR (100 MHz, CDCl$_3$, 25° C.): δ=165.43 (C), 158.66 (C), 135.25 (CH), 132.08 (C), 119.36 (CH), 116.73 (CH), 112.22 (C), 64.85 (CH$_2$), 55.76 (CH$_2$), 28.55 (CH$_3$) ppm.

2-(2-bromo-4-methylphenyl)-4,5-dihydrooxazole (18)

Pale yellow liquid, Yield 85.55%; NMR: $^1$H-NMR (400 MHz, CDCl$_3$, 25° C.): δ=7.79 (d, J=8.0 Hz, 1H), 7.50 (s, 1H), 7.17 (d, J=8.0 Hz, 1H), 4.62 (t, J=6.2 Hz, 2H), 3.64 (t, J=6.10, 2H), 2.37 (s, 3H). $^{13}$C-NMR (100 MHz, CDCl$_3$, 25° C.): δ=165.47 (C), 144.23 (C), 135.27 (CH), 131.89 (CH), 128.23 (CH), 128.18 (C), 122.25 (C), 64.70 (CH$_2$), 28.67 (CH$_3$), 21.27 (CH$_3$) ppm.

2-(2-bromo-3-methylphenyl)-4,5-dihydrooxazole (19)

Pale yellow liquid, Yield 78.52%; NMR: $^1$H-NMR (400 MHz, CDCl$_3$, 25° C.): δ=7.53 (d, J=7.6 Hz, 1H), 7.36 (d, J=7.5 Hz, 1H), 7.26 (t, J=7.6 Hz, 1H), 4.64 (t, J=6.2 Hz, 2H), 3.64 (t, J=6.2 Hz, 2H), 2.46 (s, 3H) ppm. $^{13}$C-NMR (100 MHz, CDCl$_3$, 25° C.): δ=166.75 (C), 140.03 (C), 133.62 (CH), 133.39 (C), 128.36 (CH), 127.04 (CH), 123.43 (C), 64.88 (CH$_2$), 28.54 (CH$_3$), 23.93 (CH$_3$) ppm.

5-methyl-2-phenyl-4,5-dihydrooxazole (20)

Yellow liquid, Yield 51.10% Major: NMR: $^1$H-NMR (400 MHz, CDCl$_3$, 25° C.): δ=8.08-8.04 (m, 2H, 7-H), 7.58-7.52 (m, 1H, 9-H), 7.45-7.41 (m, 2H, 8-H), 5.35-5.27 (m, 1H, 5-H), 3.60-3.53 (m, 2H, 4-H), 1.47 (d, J=6.3 Hz, 3H, 5-CH$_3$) ppm. $^{13}$C-NMR (100 MHz, CDCl$_3$, 25° C.): δ=165.95 (C2), 133.18 (C9), 130.08 (C6), 129.71 (C7), 128.44 (C8), 69.80 (C5), 35.50 (C4), 18.78 (5-CH$_3$) ppm. Minor: NMR: $^1$H-NMR (400 MHz, CDCl$_3$, 25° C.): δ=8.08-8.04 (m, 2H, 7-H), 7.58-7.52 (m, 1H, 9-H), 7.45-7.41 (m, 2H, 8-H), 4.53-4.42 (m, 2H, 4-H), 4.38-4.29 (m, 1H, 5-H), 1.76 (d, J=6.7 Hz, 3H, 5-CH$_3$) ppm. $^{13}$C-NMR (100 MHz, CDCl$_3$, 25° C.): δ=165.72 (C2), 133.31 (C9), 130.08 (C6), 129.78 (C7), 128.51 (C8), 69.29 (C4), 44.88 (C5), 22.61 (5-CH$_3$) ppm.

2-phenyl-5,6-dihydro-4H-1,3-oxazine (21)

Colourless liquid, Yield=60%. FTIR: (adsorbed on KBr, $v_{max}$, cm$^{-1}$): 3063.22 (C—H, Ar), 2962.84 (C—H, CH$_2$), 2867.63 (C—H, CH$_2$), 1717.02 (C=N), 1451.19 (C=C, Ar), 1269.43 (C—N), 1110.18 (C—O), 705.43 (CH, Ar). NMR: $^1$H-NMR (400 MHz, CDCl$_3$, 25° C.): δ=7.95 (d, J=8.0 Hz, 2H, 8-H), 7.47 (t, J=7.6 Hz, 1H, 10-H), 7.34 (t, J=7.7 Hz, 2H, 9-H), 4.37 (t, J=6.0 Hz, 2H, 6-H), 3.45 (t, J=6.6 Hz, 2H, 4-H), 2.21 (m, 2H, 5-H) ppm. $^{13}$C-NMR (100 MHz, CDCl$_3$, 25° C.): δ=166.18 (C2), 132.97 (C10), 129.93 (C7), 129.47 (C8), 128.32 (C9), 62.58 (C6), 31.75 (C5), 29.45 (C4) ppm.

2-(prop-1-en-2-yl)-5,6-dihydro-4H-1,3-oxazine (22)

Colourless liquid, Yield 38.48%; FTIR: (adsorbed on KBr, $v_{max}$, cm$^{-1}$): 2960.69 (C—H, CH$_2$), 2927.17 (C—H, CH$_2$), 2857.59 (C—H, CH$_2$), 1716.86 (C=N), 1156.02 (C—H). NMR: $^1$H-NMR (400 MHz, CDCl$_3$, 25° C.): δ=6.09 (s, 1H, 8-Ha), 5.56 (p, J=1.6 Hz, 1H, 8-Hb), 4.27 (t, J=6.0 Hz, 2H, 6-H), 3.47 (t, J=6.6 Hz, 2H, 4-H), 2.22 (m, 2H, 5-H), 1.93 (t, J=1.2 Hz, 3H, 9-H) ppm. $^{13}$C-NMR (100 MHz, CDCl$_3$, 25° C.): δ=167.28 (C2), 136.27 (C7), 125.77 (C8), 62.49 (C6), 31.87 (C5), 29.47 (C4), 18.38 (C9) ppm.

2-propyl-5,6-dihydro-4H-1,3-oxazine (23)

Pale yellow liquid, Yield 64.85%; FTIR: (adsorbed on KBr, $v_{max}$, cm$^{-1}$): 2963.76 (C—H, CH$_2$), 2933.67 (C—H, CH$_2$), 2875.46 (CH, CH$_2$), 1734.70 (C=N), 1172.56 (C—H). NMR: $^1$H-NMR (400 MHz, CDCl$_3$, 25° C.): δ=4.20 (dt, J=6.1, 1.8 Hz, 2H, 6-H), 3.45 (dt, J=6.6, 1.8 Hz, 2H, 4-H), 2.29 (dt, J=7.3, 1.8 Hz, 2H, 7-H), 2.17 (dt, J=6.2, 1.8 Hz, 2H, 5-H), 1.65 (dq, J=7.4, 1.8 Hz, 2H, 8-H), 0.95 (dt, J=7.4, 1.8 Hz, 3H, 9-H) ppm. $^{13}$C-NMR (100 MHz, CDCl$_3$, 25° C.): δ=173.51 (C), 68.32 (C), 61.97 (CH$_2$), 36.16 (CH$_2$), 31.81 (CH$_2$), 29.44 (CH$_2$), 18.49 (CH$_2$), 13.71 (CH$_3$) ppm.

2-(chloromethyl)-5,6-dihydro-4H-1,3-oxazine (24)

Pale yellow liquid, Yield 37.75%; FTIR: (adsorbed on KBr, $v_{max}$, cm$^{-1}$): 2964.19 (C—H, CH$_2$), 1736.12 (C=N), 1279.20 (CH), 1109.41 (C—O). NMR: $^1$H-NMR (400 MHz, CDCl$_3$, 25° C.): δ=4.31 (q, J=5.7 Hz, 2H, 6-H), 3.82 (s, 2H, 7-H), 3.46 (t, J=6.5 Hz, 2H, 4-H) 2.20 (t, J=6.5 Hz, 2H, 5-H) ppm. $^{13}$C-NMR (100 MHz, CDCl$_3$, 25° C.): δ=167.14 (C2), 63.92 (C6), 31.45 (C5), 29.05 (C4), 25.67 (C7) ppm.

2-isopropyl-5,6-dihydro-4H-1,3-oxazine (25)

Yellow liquid, Yield 62%; NMR: $^1$H-NMR (400 MHz, CDCl$_3$, 25° C.): δ=4.18 (t, J=5.34 Hz, 2H), 3.44 (t, J=6.72 Hz, 2H), 2.57-2.50 (m, 1H), 2.20-2.13 (m, 2H), 1.15 (d, J=7.03 Hz, 6H) ppm. $^{13}$C-NMR (100 MHz, DMSO-d$_6$, 25° C.) δ=173.4, 63.6, 33.8, 28.8, 27.0, 22.2, 13.7. MS (ESI) m/z: 510.5 [M+H]$^+$.

2-isobutyl-5,6-dihydro-4H-1,3-oxazine (26)

Yellow liquid, Yield 59%; NMR: $^1$H-NMR (400 MHz, CDCl$_3$, 25° C.): δ=4.20 (t, J=5.59 Hz, 2H), 3.45 (t, J=6.45

Hz, 2H), 2.20-2.15 (m, 4H), 2.13-2.05 (m, 1H), 0.95 (d, J=6.60 Hz, 6H) ppm. $^{13}$C-NMR (100 MHz, DMSO-d$_6$, 25° C.) δ=173.4, 63.6, 33.8, 28.8, 27.0, 22.2, 13.7 ppm.

2-butyl-5,6-dihydro-4H-1,3-oxazine (27)

Colourless liquid, Yield 48%; NMR: $^1$H-NMR (400 MHz, CDCl$_3$, 25° C.): δ=4.20 (t, J=6.10 Hz, 2H), 3.45 (t, J=6.61 Hz, 2H), 2.30 (t, J=7.85 Hz, 2H), 2.18-2.15 (m, 2H), 1.64-1.56 (m, 2H), 1.37-1.29 (m, 2H), 0.91 (t, J=7.10 Hz, 3H) ppm. $^{13}$C-NMR (100 MHz, DMSO-d$_6$, 25° C.) δ=173.4, 63.6, 33.8, 28.8, 27.0, 22.2, 13.7 ppm.

2-cyclohexyl-5,6-dihydro-4H-1,3-oxazine (28)

Yellow liquid, Yield 43%; NMR: $^1$H-NMR (400 MHz, DMSO-d$_6$, 25° C.) δ=4.17 (t, J=6.0 Hz, 2H), 3.43 (t, J=6.6 Hz, 2H), 2.31-2.24 (tt, J=11.3, 3.7 Hz, 1H), 2.1 (p, J=6.4 Hz, 2H), 1.87 (m, 2H), 1.72 (m, 2H), 1.62 (m, 1H), 1.41 (m, 2H), 1.31-1.18 (m, 4H) ppm; $^{13}$C-NMR (100 MHz, DMSO-d$_6$, 25° C.) δ=175.92 (C), 61.84 (CH$_2$), 43.18 (CH), 31.81 (CH$_2$), 29.48 (CH$_2$), 29.05 (CH$_2$), 25.78 (CH$_2$), 25.46 (CH$_2$) ppm.

2-(2-iodophenyl)-5,6-dihydro-4H-1,3-oxazine (29)

Colourless liquid, Yield 43.02%; FTIR: (adsorbed on KBr, ν$_{max}$, cm$^{-1}$): 2958.04 (C—H, CH$_2$), 2921.01 (C—H, CH$_2$), 2851.10 (C—H, CH$_2$), 1726.65 (C=N), 1286.84 (C—O), 1246.07 (C—O), 1127.08 (C—N), 1102.66 (C—N), 739.24 (C—H, Ar). NMR: $^1$H-NMR (400 MHz, CDCl$_3$, 25° C.): δ=7.98 (d, J=7.8 Hz, 1H), 7.77 (dd, J=7.7 Hz, 1H), 7.42-7.38 (m, 1H), 7.17-7.13 (m, 1H), 4.47 (t, J=6.00 Hz, 2H), 3.51-3.47 (m, 1H), 2.33 (p, J=6.2 Hz, 2H) ppm. $^{13}$C-NMR (100 MHz, CDCl$_3$, 25° C.): δ=166.43, 141.33, 135.25, 132.75, 130.98, 128.00, 93.97, 68.45, 30.63, 29.60 ppm.

2-(2-bromophenyl)-5,6-dihydro-4H-1,3-oxazine (30)

Yellow oil, Yield 72%; FTIR: (adsorbed on KBr, ν$_{max}$, cm$^{-1}$): 2962.17 (C—H, CH$_2$), 2865.22 (C—H, CH$_2$), 1729.85 (C=N), 1289.68 (C—O), 1246.47 (C—O), 1109 (C—N), 743.31 (C—H, Ar). NMR: $^1$H-NMR (400 MHz, CDCl$_3$, 25° C.): δ=7.77 (d, J=7.35 Hz, 1H, 9-H), 7.65 (d, J=7.35 Hz, 1H, 12-H), 4.24 (m, 2H, 10-H, 11-H), 4.48 (t, J=5.96 Hz, 2H, 6-H), 3.56 (t, J=6.47 Hz, 2H, 4-H), 2.35-2.28 (m, 2H, 5-H) ppm. $^{13}$C-NMR (100 MHz, CDCl$_3$, 25° C.): δ=166.43 (C2), 134.69 (C7), 132.99 (C9), 132.53 (C12), 131.68 (C10), 127.56 (C11), 121.88 (C8), 68.60 (C-4), 63.69 (C-6), 33.10 (C-5) ppm.

2-(phenoxymethyl)-5,6-dihydro-4H-1,3-oxazine (31)

Yellow liquid, Yield 48%; NMR: $^1$H-NMR (400 MHz, DMSO-d$_6$, 25° C.) δ=7.29 (t, J=8.0 Hz, 2H), 6.99 (t, J=7.4 Hz, 1H), 6.90 (d, J=8.0 Hz, 2H), 4.64 (s, 2H), 4.33 (t, J=6.0 Hz, 2H), 3.35 (t, J=6.5 Hz, 2H), 2.17 (m, 2H) ppm; $^{13}$C-NMR (100 MHz, DMSO-d$_6$, 25° C.) δ 169.0 (C), 157.88 (C), 129.71 (CH), 121.94 (CH), 114.67 (CH), 65.36 (CH$_2$), 63.06 (CH$_2$), 31.55 (CH$_2$), 29.12 (CH$_2$) ppm.

2-(phenoxymethyl)-5,6-dihydro-4H-1,3-oxazine (32)

Yellow liquid, Yield 46%; NMR: $^1$H-NMR (400 MHz, DMSO-d$_6$, 25° C.) δ=7.57 (dd, J=1.8, 0.9 Hz, 1H), 7.18 (dd, J=3.5, 0.9 Hz, 1H), 6.50 (dd, J=3.5, 1.8 Hz, 1H), 4.44 (t, J=6.1 Hz, 2H), 3.51 (t, J=6.6 Hz, 2H), 2.29 (m, 2H) ppm; $^{13}$C-NMR (100 MHz, DMSO-d$_6$, 25° C.) δ=158.56 (C), 146.51 (CH), 144.51 (C), 118.21 (CH), 111.95 (CH), 62.67 (CH$_2$), 31.84 (CH$_2$), 29.29 (CH$_2$) ppm.

2-(thiophen-2-yl)-5,6-dihydro-4H-1,3-oxazine (33)

Brown oil: 506 mg, Yield 77%; FTIR: (adsorbed on KBr, ν$_{max}$, cm$^{-1}$): 2966.06 (C—H, CH$_2$), 2923.78 (C—H, CH$_2$), 1707.17 (C=N), 1257.56 (C—O), 1220.60 (C—O), 1095.48 (C—N), 747.31-721.26 (C—H, Ar). NMR: $^1$H-NMR (400 MHz, CDCl$_3$, 25° C.): δ=7.81 (d, 1H, J=2.34 10-H), 7.56 (d, J=2.34 Hz, 1H, 8-H), 7.10 (t, J=6.35 Hz, 2H, 9-H), 4.44 (t, J=6.03 Hz, 2H, 6-H), 3.53 (t, J=6.03 Hz, 2H, 4-H), 2.33-2.26 (m, 2H, 5-H) ppm. $^{13}$C-NMR (100 MHz, CDCl$_3$, 25° C.): δ=162.31 (C2), 133.91 (C8), 133.81 (C7), 132.89 (C9), 128.14 (C10), 68.59 (C4), 63.13 (C6), 33.09 (C5) ppm.

3-phenyl-5,6-dihydro-1,4,2-dioxazine (34)

Colourless liquid; Yield: 72.27%; FTIR: (adsorbed on KBr, ν$_{max}$, cm$^{-1}$): 2957.91 (C—H, CH$_2$), 2926.66 (C—H, CH$_2$), 1718.47 (C=N), 1451.55 (C—H, Ar), 1264.74 (C—O), 1109.85 (C—O), 707.72 (C—H, Ar). NMR: $^1$H-NMR (400 MHz, CDCl$_3$, 25° C.): δ 8.06 (d, J=8.0 Hz, 2H, 8-H), 7.56 (t, J=7.5 Hz, 1H, 10-H), 7.4 (t, J=7.8 Hz, 2H, 9-H), 4.61 (t, J=6.1 Hz, 2H, 5-H), 3.63 (t, J=6.1 Hz, 2H, 6-H), ppm; $^{13}$C-NMR (100 MHz, CDCl$_3$, 25° C.): δ=166.06 (C$_3$), 133.29 (C10), 129.76 (C8), 129.65 (C7), 128.47 (C9), 64.24 (C5), 28.85 (C6) ppm.

2-phenyl-5,6-dihydro-4H-1,3,4-oxadiazine (35)

Colourless liquid, Yield: 65.00%; FTIR: (adsorbed on KBr, ν$_{max}$, cm$^{-1}$): 3461.01 (C—H), 2955.46 (C—H, CH$_2$), 2928.29 (C—H, CH$_2$), 1718.26 (C=N), 1264.13 (C—N), 1109.71 (C—O), 708.33 (C—H, Ar); NMR: $^1$H-NMR (400 MHz, CDCl$_3$, 25° C.): δ 8.06 (d, J=8.0 Hz, 2H, 8-H), 7.56 (t, J=7.5 Hz, 1H, 10-H), 7.4 (t, J=7.7 Hz, 2H, 9-H), 4.61 (t, J=6.1 Hz, 2H, 6-H), 3.63 (t, J=6.1 Hz, 2H, 5-H) ppm; $^{13}$C-NMR (100 MHz, CDCl$_3$, 25° C.): δ=166.11 (C2), 133.33 (C10), 129.80 (C8), 129.69 (C7), 128.51 (C9), 64.28 (C6), 28.87 (C5) ppm.

This above description of some of the illustrative embodiments of the invention is to indicate how the invention can be made and carried out. Those of ordinary skill in the art will know that various details and substituents may be modified thereby arriving at further embodiments, but that many of these embodiments will remain within the scope of the invention.

The invention claimed is:
1. A method for the synthesis of a compound of the Formula (II)

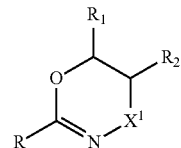

Formula (II)

the method comprising reacting a carboxamide or carboxamide derivative of the Formula (IIa)

Formula (IIa)

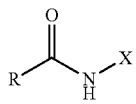

with a substituted alkanol of the Formula (IIb)

Formula (IIb)

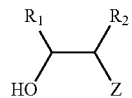

wherein,

X is selected from the group consisting of $NH_2$, $NHR^4$, and OH;

$X^1$ is selected from the group consisting of NH, O, and $NR^4$;

$R^1$ is selected from the group consisting of hydrogen and optionally substituted linear or branched $C_1$-$C_{10}$ alkyl;

$R^2$ is selected from the group consisting of hydrogen and optionally substituted linear or branched $C_1$-$C_{12}$ alkyl, optionally substituted cycloalkyl, optionally substituted heterocycloalkyl, and optionally substituted aryl;

R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocycloalkyl, optionally substituted aryl, and optionally substituted heteroaryl, Z is siloxyl, methanesulphonate, para-toluenesulfonate, or a halogen atom selected from the group consisting of Br, Cl, I and F, $R^4$ is optionally substituted alkyl; and wherein the method comprises providing the carboxamide or carboxamide derivative and the substituted alkanol in a single reaction vessel to form a reaction mixture, and heating the reaction mixture at a temperature of about 100° C. to about 160° C. to yield the compound of the Formula (II).

2. A method for the synthesis of a compound of the Formula (III)

Formula (III)

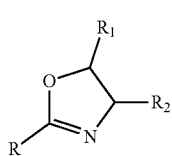

the method comprising reacting a carboxamide or carboxamide derivative of the Formula (IIIa)

Formula (IIIa)

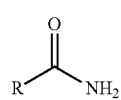

with a substituted alkanol of the Formula (IIIb)

Formula (IIIb)

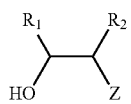

wherein, $R^1$ is selected from the group consisting of hydrogen and optionally substituted linear or branched $C_1$-$C_{10}$ alkyl;

$R^2$ is selected from the group consisting of hydrogen and optionally substituted alkyl;

R is selected from the group consisting of hydrogen, optionally substituted linear or branched alkyl, optionally substituted linear or branched alkenyl, optionally substituted linear or branched alkoxy, optionally substituted cycloalkyl, optionally substituted heterocycloalkyl, optionally substituted aryl, and optionally substituted heteroaryl, Z is siloxyl, methanesulphonate, para-toluenesulfonate, or a halogen atom selected from the group consisting of Br, Cl, I and F, and wherein the method comprises providing the carboxamide and the substituted alkanol in a single reaction vessel to form a reaction mixture, and heating the reaction mixture at a temperature of about 100° C. to about 160° C. to yield the compound of the Formula (III).

3. The method according to claim 1, wherein R is selected from the group consisting of optionally substituted linear or branched $C_1$-$C_{10}$ alkyl, optionally substituted linear or branched $C_2$-$C_{10}$ alkenyl, optionally substituted linear or branched $C_1$-$C_{10}$ alkoxy, optionally substituted $C_3$-$C_6$ cycloalkyl, optionally substituted $C_3$-$C_6$ heterocycloalkyl, optionally substituted $C_3$-$C_6$ aryl, and optionally substituted $C_3$-$C_6$ heteroaryl.

4. The method according to claim 1, wherein the reaction proceeds in the absence of any solvent, catalyst, base, or other reagents.

5. The method according to claim 1, wherein R is substituted linear or branched $C_1$-$C_{10}$ alkyl substituted with one or more groups selected from the group consisting of halogen, CN, or OH.

6. The method according to claim 1, wherein R is substituted linear or branched $C_2$-$C_{10}$ alkenyl substituted with one or more groups selected from the group consisting of halogen, CN, or OH.

7. The method according to claim 1, wherein R is substituted linear or branched $C_1$-$C_{10}$ alkoxy substituted with one or more groups selected from the group consisting of halogen, CN, or OH.

8. The method according to claim 1, wherein R is substituted $C_3$-$C_6$ cycloalkyl, substituted $C_3$-$C_6$ heterocycloalkyl, substituted $C_3$-$C_6$ aryl, or substituted $C_3$-$C_6$ heteroaryl, independently substituted with one or more groups selected from the group consisting of linear or branched $C_1$-$C_{10}$ alkoxy, halogen, $NO_2$, optionally substituted linear or branched $C_1$-$C_{10}$ alkyl.

9. The method according to claim 1, wherein R is substituted $C_3$-$C_6$ aryl, substituted with one or more groups selected from the group consisting of halogen, $NO_2$, linear or branched $C_1$-$C_{10}$ alkoxy, optionally substituted linear or branched $C_1$-$C_{10}$ alkyl.

10. The method according to claim 1, wherein R is a group selected from the group consisting of:

11. The method according to claim 1, wherein the compound of the Formula (II) is a compound selected from the group consisting of:

3-phenyl-5,6-dihydro-1,4,2-dioxazine and
2-phenyl-5,6-dihydro-4H-1,3,4-oxadiazine.

12. The method according to claim 1, wherein the compound of Formula (III) is a compound selected from the group consisting of:

2-phenyl-4,5-dihydrooxazole;
2-(prop-1-en-2-yl)-4,5-dihydrooxazole;
2-propyl-4,5-dihydrooxazole;
2-(chloromethyl)-4,5-dihydrooxazole;
2-(4,5-dihydrooxazol-2-yl) acetonitrile;
2-isopropyl-4,5-dihydrooxazole;
2-(tert-butyl)-4,5-dihydrooxazole;
2-butyl-4,5-dihydrooxazole;
2-(trichloromethyl)-4,5-dihydrooxazol;
2-cyclohexyl-2,5-dihydrooxazole;
2-(2-iodophenyl)-4,5-dihydrooxazole;
2-(phenoxymethyl)-4,5-dihydrooxazole;
2-(thiophen-2-yl)-4,5-dihydrooxazole;
2-(2-fluorophenyl)-4,5-dihydrooxazole;
2-(2-nitrophenyl)-4,5-dihydrooxazole;
2-(2,5-dibromophenyl)-4,5-dihydrooxazole;
2-(2-bromo-5-methoxyphenyl)-4,5-dihydrooxazole;
2-(2-bromo-4-methylphenyl)-4,5-dihydrooxazole;
2-(2-bromo-3-methylphenyl)-4,5-dihydrooxazole; and
5-methyl-2-phenyl-4,5-dihydrooxazole.

* * * * *